United States Patent
Kawamura et al.

(10) Patent No.: US 6,453,110 B1
(45) Date of Patent: Sep. 17, 2002

(54) ELECTRONIC EQUIPMENT CONTROL SYSTEM AND METHOD, REPRODUCING APPARATUS, OUTPUT APPARATUS AND TRANSMISSION MEDIUM

(75) Inventors: Harumi Kawamura, Tokyo; Jun Yonemitsu, Kanagawa; Makoto Sato, Tokyo; Hiraku Inoue, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/108,396

(22) Filed: Jul. 1, 1998

(30) Foreign Application Priority Data

Jul. 4, 1997 (JP) .............................. 9-179324

(51) Int. Cl.7 ........................... H04N 7/00; G11B 27/00
(52) U.S. Cl. ........................................ 386/46; 386/52
(58) Field of Search ........................... 386/46, 109, 111, 386/112, 52, 125, 124, 126, 105, 106, 45, 4, 27, 33, 55; G11B 27/00, 7/00

(56) References Cited

U.S. PATENT DOCUMENTS 5,126,851 A * 6/1992 Yoshimura et al.
5,568,275 A * 10/1996 Norton et al.

FOREIGN PATENT DOCUMENTS

| EP | 0 669 761 | 8/1995 |
|---|---|---|
| EP | 0 735 765 | 10/1996 |
| EP | 0 833 514 | 4/1998 |
| EP | 0 843 468 | 5/1998 |
| EP | 0 849 884 | 6/1998 |
| WO | WO 96/19779 | 6/1996 |

* cited by examiner

*Primary Examiner*—Robert Chevalier
(74) *Attorney, Agent, or Firm*—Frommer Lawrence & Haug LLP; William S. Frommer

(57) ABSTRACT

An equipment unit having an interactive user interface is controlled by means of a simple apparatus. Data reproduced by a DVD player is decoded. The decoded data is converted into a signal format such as DVC SD or MPEG2-TS along with information about such as a menu. The converted information is transmitted to a simple display device through the 1394 digital interface. When a predetermined item in the menu displayed on the screen of the simple display device is selected by operating a remote commander, a corresponding panel command such as "CURSOR UP" or "EXEC" is transmitted to the DVD player. The selected item is recognized by the DVD player and necessary processing is executed.

11 Claims, 5 Drawing Sheets

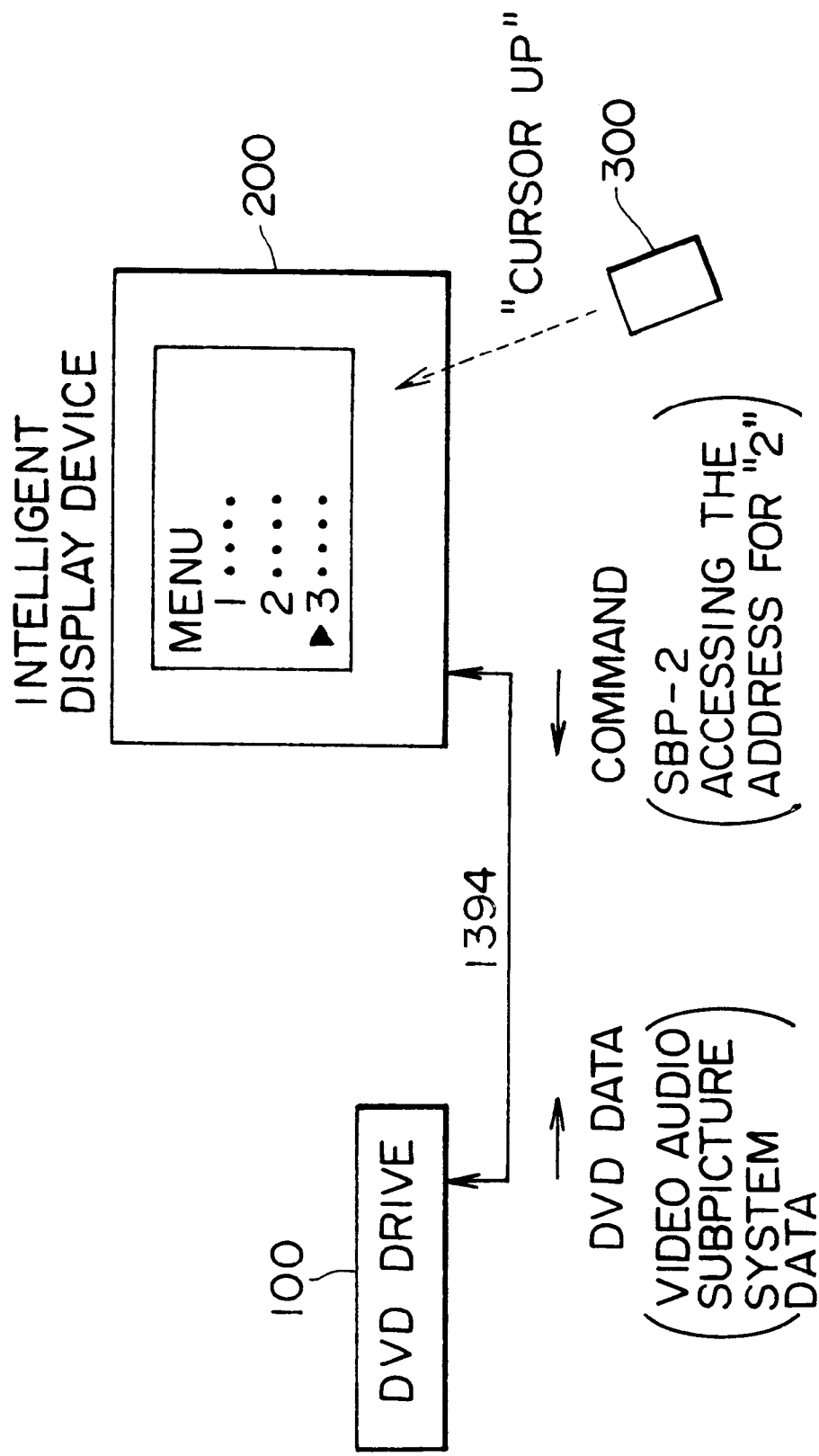

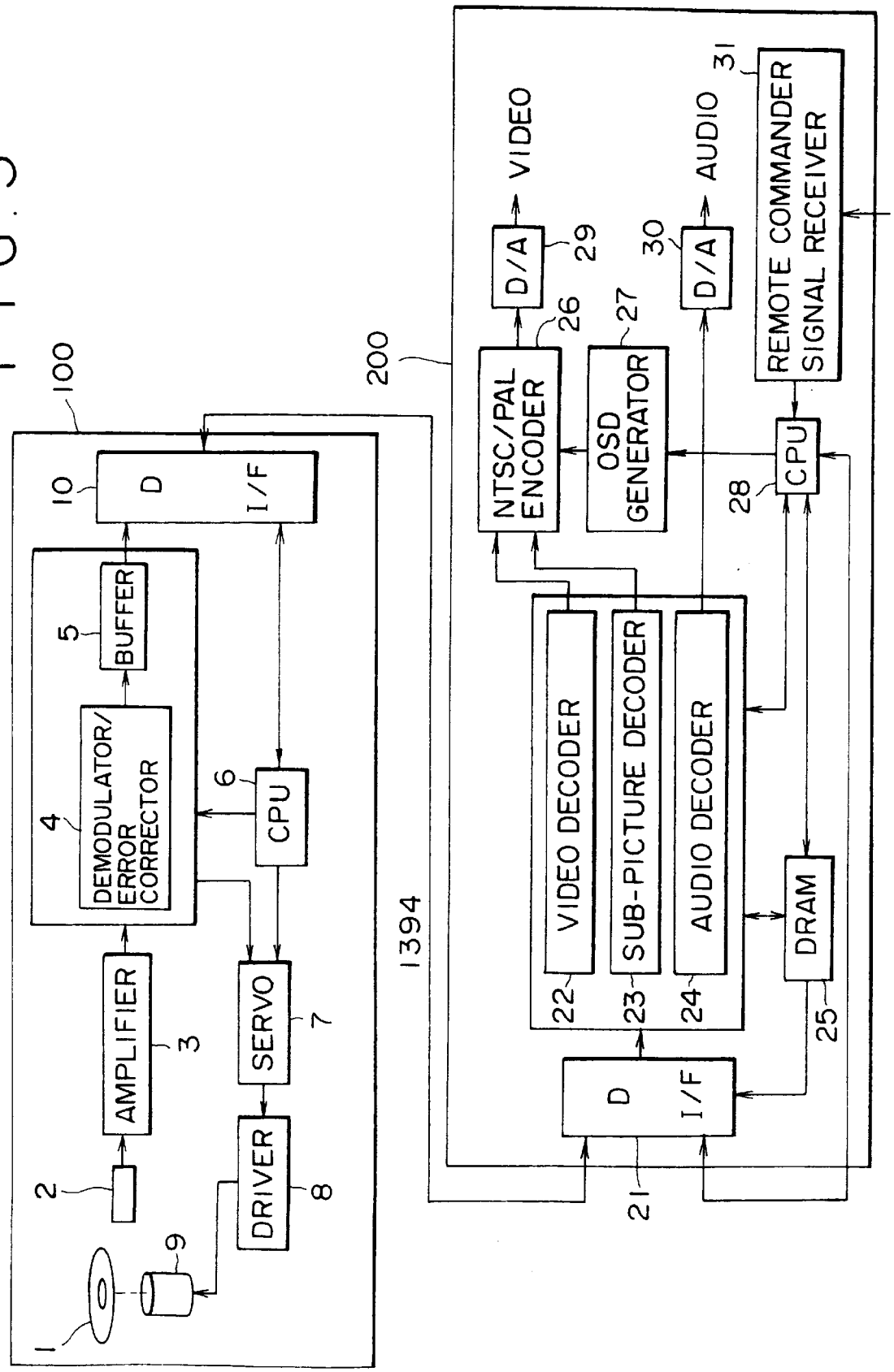

ELECTRONIC EQUIPMENT CONTROL SYSTEM AND METHOD, REPRODUCING APPARATUS, OUTPUT APPARATUS AND TRANSMISSION MEDIUM

BACKGROUND OF THE INVENTION

The present invention generally relates to an electronic equipment control system, an electronic equipment control method, a reproducing apparatus, an output apparatus, and a transmission medium. To be more particular, the present invention relates to an electronic equipment control system, an electronic equipment control method, a reproducing apparatus, an output apparatus, and a transmission medium that are capable of controlling equipment having an interactive user interface by a simple device.

The AV equipment control commands (AV/C commands) of IEEE (Institute of Electrical and Electronics Engineers) 1394 "High Performance Serial Bus Standard" (hereafter referred to as the 1394 digital interface as appropriate) are adapted to send a command to a target equipment unit to put the same into a desired state, enabling automatic control thereof.

For example, a control command PLAYBACK PAUSE puts a target equipment unit into a state in which playback is paused. On the contrary, an ordinary PAUSE command as used in an infrared remote commander only tells a target equipment unit that the PAUSE key of the remote commander has been pressed. Receiving the PAUSE command, the equipment unit executes a predetermined operation according to its state.

Sometimes, human operations must be transmitted directly to a target equipment unit without resorting to automatic control. For example, when moving a cursor displayed on a menu screen vertically or horizontally, positioning the cursor at a desired menu item displayed on the screen, and then operating a predetermined button to select that menu item, the cursor is moved vertically or horizontally, the position is determined, the selected menu item is recognized by the controller, and a command for putting the equipment into a required state is issued by the related art AV/C command system.

Therefore, the controller receives the signals from all equipment units connected through the digital interface and decodes the received signals to recognize the selection made on the menu screen.

FIG. 4 illustrates an example of the constitution of a related art AV system. As shown, a DVD (Digital Versatile Disc) drive 100 and an intelligent display device 200 are interconnected through the 1394 digital interface. As will be described later, the intelligent display device 200 sends a command in compliance with the SBP-2 (Serial Bus Protocol 2) specifications to the DVD drive 100 and the DVD drive 100 sends DVD data such as video data, audio data, sub-picture data, or system data to the intelligent display device 200.

FIG. 5 is a block diagram illustrating an example of constitutions of the intelligent display device 200 and the DVD drive 100. A remote commander signal receiver 31 constituting the intelligent display device 200 receives a remote commander signal coming from the remote commander 300 on infrared radiation for example and supplies a command specified by the received signal to a CPU (Central Processing Unit) 28 to be described later. According to the command supplied from the remote commander signal receiver 31, the CPU 28 executes specified control on the intelligent display device 200.

An interface 21 extracts video data, sub-picture data, and audio data from a packet transmitted from the DVD drive 100 through the 1394 digital interface and supplies the video data to a video decoder 22, the sub-picture data to a sub-picture decoder 23, and the audio data to the audio data decoder 24.

The packet also includes information about such as a menu. An I/F 21 supplies this information to a DRAM 25. The CPU 28 reads the information about such as a menu from the DRAM 25 and supplies the information to an OSD (On Screen Display) generator 27. The OSD generator 27, based on the information supplied from the CPU 28, generates a menu screen composed of predetermined character strings, graphics, icons, and so on and supplies the generated menu screen to an NTSC/PAL encoder 26.

The video decoder 22 decodes the video data supplied from the I/F 21 and supplies the decoded data to an NTSC/PAL encoder. The sub-picture decoder 23 decodes the sub-picture data supplied from the I/F 21 and supplies the decoded data to the NTSC/PAL encoder 26. The audio decoder 24 decodes the audio data supplied from the I/F 21 and supplies the decoded data to a D/A converter 30. The D/A converter 30 converts the digital audio data supplied from the audio decoder 24 into an analog audio signal and outputs the same.

The NTSC/PAL encoder 26 merges the video data supplied from the video decoder 22, the sub-picture data supplied from the sub-picture decoder 23, and the data corresponding to the menu screen supplied from the OSD generator 27, converts the merged data into a digital signal corresponding to an NTSC video signal, and supplies this signal to a D/A converter 29. The D/A converter 29 converts the digital signal supplied from the NTSC/PAL encoder 26 into an analog signal and outputs the same.

On the other hand, a servo 7 constituting the DVD drive 100 controls a driver 8 by way of a CPU 6, rotating a motor 9. The CPU 6 controls the components of the DVD drive 100. An optical pickup 2 radiates light such as a laser beam onto a disc 1 and receives the reflected light therefrom to read signals recorded on the disc 1.

An amplifier 3 amplifies the signal read by the optical pickup 2 and supplies the amplified signal to a demodulator/error corrector 4. The demodulator/error corrector 4 demodulates the signal supplied from the amplifier 3, performs error correction on the demodulated signal, and supplies the resultant signal to an I/F 10 through a buffer 5.

The I/F 10 forms the signal supplied through the buffer 5 into a packet compatible with the 1394 digital interface and transmits this packet to the intelligent display device 200 through the 1394 digital interface.

The following describes the operations of the above-mentioned devices. The servo 7 controls the driver 8 by way of the CPU 6 to drive the motor 9. The motor 9 rotates the disc 1. From the optical pickup 2, a laser beam is radiated under the control of the CPU 6 onto the recording surface of the disc 1. The laser beam reflected from the recording surface of the disc 1 is received by a photodetector constituting the optical pickup 2 to be converted into an electrical signal, which is supplied to the amplifier 3.

The signal supplied to the amplifier 3 is amplified to be supplied to the demodulator/error corrector 4. The amplified signal supplied to the demodulator/error corrector is demodulated and error-corrected to be supplied to the I/F 10 through the buffer 5. The signal supplied to the I/F 10 is formed into a packet compatible with the 1394 digital interface to be transmitted to the intelligent display device 200 through the 1394 digital interface.

The packet supplied to the intelligent display device 200 is converted by the I/F 21 into the original digital data. The video data included in this signal is supplied to the video decoder 22 and the sub-picture data included in this signal is supplied to the sub-picture decoder 23. The audio data included in this signal is supplied to the audio decoder 24. The information about such as a menu included in this signal is supplied to the DRAM 25 to be stored therein.

The video data supplied to the video decoder 22 is decoded into the original video data, which is supplied to the NTSC/PAL encoder 26. The sub-picture data supplied to the sub-picture decoder 23 is decoded into the original sub-picture data, which is supplied to the NTSC/PAL encoder 26. The audio data supplied to the audio decoder 24 is decoded into the original audio data, which is supplied to the D/A converter 30. The D/A converter 30 converts the audio data supplied from the audio decoder 24 into an analog audio signal, which is then outputted.

The information about such as a menu stored in the DRAM 25 is read by the CPU 28 to be supplied to the OSD generator 27. The OSD generator 27 generates a menu screen from the information about such as a menu supplied from the CPU 28 and supplies the data corresponding to the generated menu screen to the NTSC/PAL encoder 26.

The video data, the sub-picture data, and the data corresponding to the menu screen are merged in the NTSC/PAL encoder 26 into data compatible with NTSC or PAL. The resultant NTSC or PAL data is supplied to the D/A converter 29. The D/A converter 29 converts the NTSC or PAL data supplied from the NTSC/PAL encoder 26 into an analog video data, which is then outputted.

For example, as shown in FIG. 4, it is assumed that a menu screen having three selection items is shown on the intelligent display device 200 and a cursor is positioned at the beginning of the third item. In this system, file access of the DVD drive 100 is all controlled by the intelligent display device 200, so that the intelligent display device 200 recognizes the contents of the currently displayed menu screen.

In the above-mentioned state, when the remote commander 300 is operated to move the cursor up "CURSOR UP," a remote commander signal indicative of the cursor-up operation is transmitted on infrared radiation. The remote commander signal receiver 31 of the intelligent display device 200 converts the signal received from the remote commander 300 into the command and supplies the same to the CPU 28. The CPU 28 recognizes, from the command supplied from the remote commander signal receiver 31, that the selected item is an item one step over the third item, namely the selected item is the second item in the menu. Then, the CPU 28 controls the OSD generator 27, moves the cursor displayed on the menu screen upward by one position and displays the cursor at the beginning of the second item.

When the remote commander 300 is operated again in the above-mentioned state to indicate execution ("EXEC") of the selection, a remote commander signal made up of an "EXEC" command is transmitted from the remote commander 300. The remote commander signal receiver 31 of the intelligent display device 200 converts the signal received from the remote commander 300 into the command and supplies the same to the CPU 28. The CPU 28 recognizes, from the command supplied from the remote commander signal receiver 31, that selection of the second item at which the cursor is currently positioned has been established.

In order to execute the processing specified by the selected second item, the CPU 28 checks which address of the disc 1 loaded in the DVD drive 100 is to be accessed. Then, the CPU 28 sends a PC control command specified with the determined address, a SCSI-on-SBP2 for example, to the DVD drive 100 through the 1394 digital interface, executing reliable control.

As described above, the controller side must receive the signals of all equipment units interconnected through the digital interface and decode the received signals to recognize an item selected on the menu screen, thereby increasing the load on the controller side.

The display monitor as an AV equipment unit is not always an intelligent display device as mentioned above. The primary application of a digital device is to decode signals recorded on a digital VCR (Video Cassette Recorder) such as a DV (Digital Video) and a D-VHS (Digital VHS), monitor these signals, and receive digital broadcasting.

SUMMARY OF THE INVENTION

It is therefore an object of the present invention to control interactive information recording media such as the DVD by use of a simple digital display device.

BRIEF DESCRIPTION OF THE DRAWINGS

These and other objects of the invention will be seen by reference to the description, taken in connection with the accompanying drawing, in which:

FIG. 4 is a schematic diagram illustrating an AV system having a related art interactive user interface; and FIG. 5 is a block diagram illustrating constitutions of a DVD drive 100 and an intelligent display device 200 shown in FIG. 4.

DETAILED DESCRIPTION OF PREFERRED EMBODIMENTS

This invention will be described in further detail by way of example with reference to the accompanying drawings.

Figure 1:
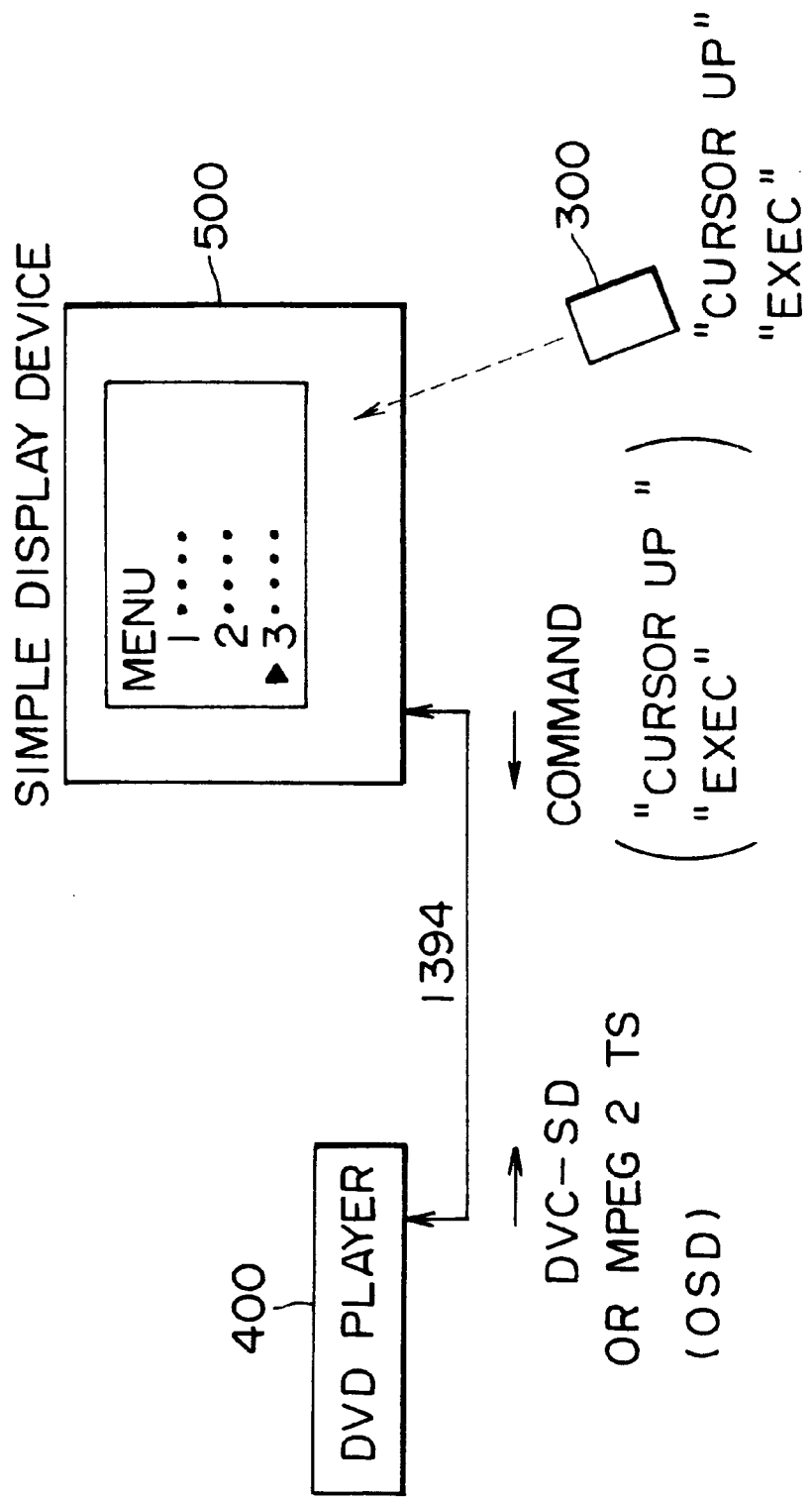
FIG. 1 is a schematic diagram illustrating a constitution of an AV system having an interactive user interface to which an electronic equipment control system associated with the present invention is applied.

FIG. 1 is a schematic diagram illustrating a constitution of a preferred embodiment of an AV system to which a communication control system associated with the present invention. In this embodiment, a simple digital display device (hereafter also referred to as a simple display device) 500, rather than the above-mentioned intelligent display device, is connected to a DVD (Digital Versatile Disc) player 400 through the 1349 digital interface.

From the simple display device 500 to the DVD player 400, commands such as moving cursor upward ("CURSOR UP") and executing the selection ("EXEC") are supplied. From the DVD player 400 to the simple display device 500, a reproduced signal of a DVD 1 is supplied. This reproduced signal is encoded into a signal format such as DVCR SD or MPEG2 (Moving Picture Experts Group 2)-TS with a menu displayed as shown in FIG. 1.

Therefore, the simple display device 500 can easily receive and display a reproduced signal corresponding to the screen with a menu from the DVD player 400 displayed.

Figure 2:
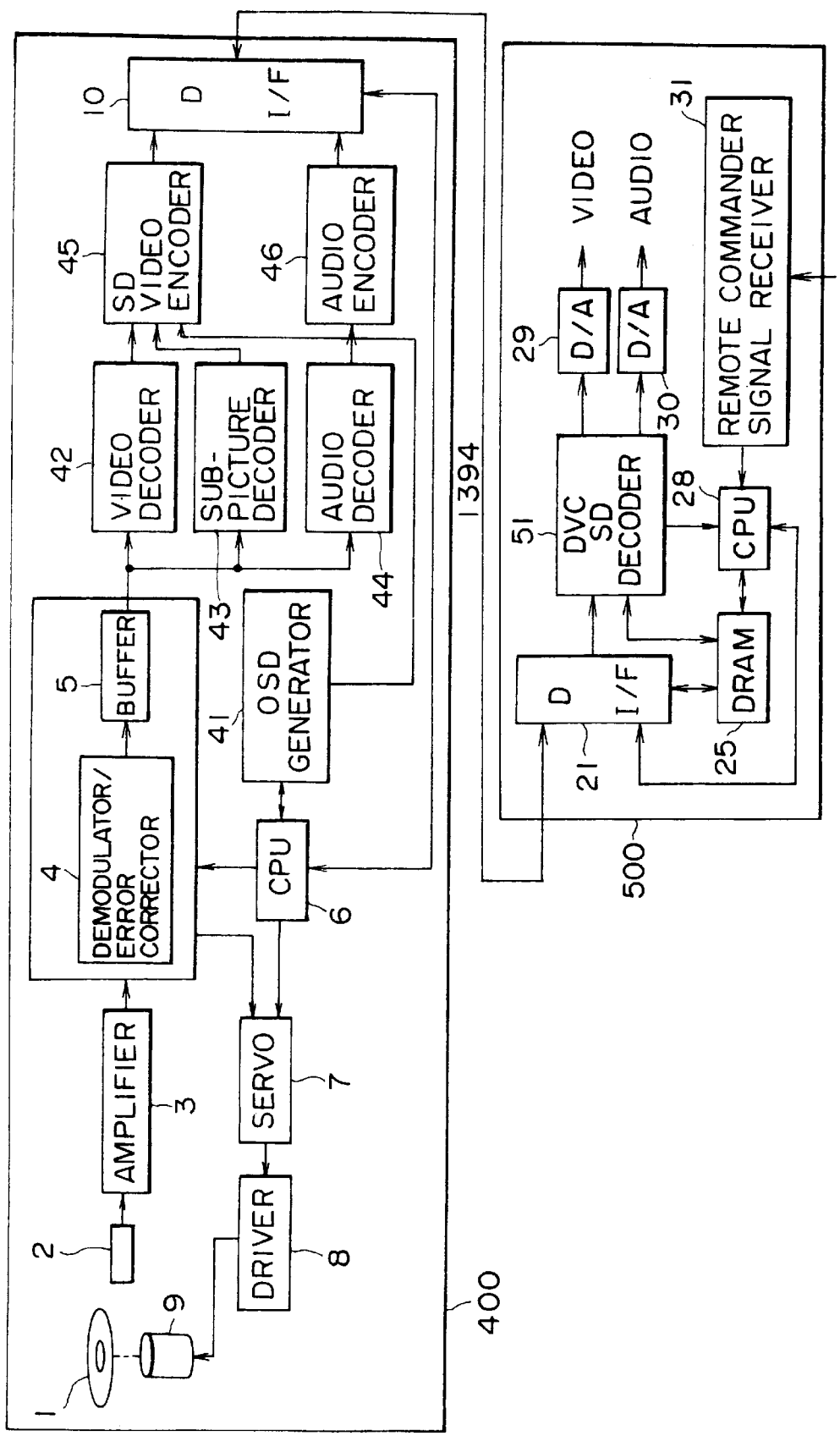
FIG. 2 is a block diagram illustrating constitutions of a DVD player 400 and a simple display device 500 shown in FIG. 1.

FIG. 2 is a block diagram illustrating constitutions of the simple display device 500 and the DVD player 400 shown in FIG. 1. As shown, the simple display device 500 has a DVC SD decoder 51 instead of the NTSC/PAL encoder 26, the OSD generator 27, the video decoder 22, the sub-picture decoder 23, and the audio decoder 24 of the intelligent display device 200 shown in FIG. 5. The DVC SD decoder 51 decodes the video data and audio data encoded into DVC SD supplied from the DVD player 400 through an I/F 21 (a second receiving means, a second transmitting means, a receiving means, and a transmitting means).

On the other hand, the DVD player 400 has a video decoder 42 (decoding means), a sub-picture decoder 43 (decoding means), an audio decoder 44 (decoding means), an OSD generator 41 (first generating means, generating means), an SD video encoder 45, and an audio encoder 46 in addition to the components of the DVD drive 100 shown in FIG. 5.

The OSD generator 41 generates a menu screen from the information about a menu and so on supplied from a CPU 6 (control means) and supplies the generated menu screen to the SD video encoder 45. The video decoder 42 decodes the video data supplied from a buffer 5 and demodulated and error-corrected and supplies the decoded data to the SD video encoder 45. The sub-picture decoder 43 decodes the video data supplied from the buffer 5 and demodulated and error-corrected. The audio decoder 44 decodes the audio data supplied from the buffer 5 and demodulated and error-corrected and supplies the decoded data to the audio encoder 46.

The SD video encoder 45 encodes the video data supplied from the video encoder 42, the sub-picture data supplied from the sub-picture decoder 43, and the data for the menu screen supplied from the OSD generator 41 into the signal format of DVCR SD or MPEG2-TS and supplies the resultant data to an I/F 10 (first transmitting means, first receiving means, transmitting means, and receiving means). The audio encoder 46 encodes the audio data supplied from the audio decoder 44 into the signal format of DVCR SD or MPEG2-TS and supplies the resultant data to the I/F 10.

The other portions of constitution are generally the same as those shown in FIG. 5 and therefore omitted from the description.

The following describes the operations of the above-mentioned embodiment. Under the control of the CPU 6, a servo 7 controls a driver 8 to drive a motor 9, rotating the disc 1. Under the control of the CPU 6, a laser beam is emitted from an optical pickup 2 (reproducing means) to radiated onto the recording surface of the disc 1. The laser beam reflected from the recording surface of the disc 1 is received by a photodetector that constitutes the optical pickup 2, from which a signal indicative of the read data is supplied to an amplifier 3.

The signal supplied to the amplifier 3 is amplified to be supplied to a demodulator/error corrector 4. The signal supplied to the demodulator/error corrector 4 is demodulated and error-corrected to be supplied to the video decoder 42 through the buffer 5. The sub-picture data is supplied to the sub-picture decoder 43. The audio data is supplied to the audio decoder 44.

The video data supplied to the video decoder 42 is decoded to be supplied to the SD video encoder 45. The sub-picture data supplied to the sub-picture decoder 43 is decoded to be supplied to the SD video encoder 45. The audio data supplied to the audio decoder 44 is decoded to be supplied to the SD video encoder 45.

In the SD video encoder 45, the video data supplied from the video decoder 42, the sub-picture data supplied from the sub-picture decoder 43, and the data corresponding to the screen such as data about a menu supplied from the OSD generator 41 are encoded into the signal format of DVCR SD or MPEG2-TS. The data of this signal format is then supplied to the I/F 10. On the other hand, the audio data supplied to the audio encoder 46 is encoded into the signal format of DVCR SD or MPEG2-TS to be supplied to the I/F 10.

The encoded video data and audio data supplied to the I/F 10 are formed into a packet compatible with the 1394 digital interface to be supplied to the simple display device 500 through the 1394 digital interface.

The packet supplied to the simple display device 500 is supplied to the DVC SD decoder 51 through the I/F 21. In the DVC SD decoder 51, the data encoded into the format of DVCR SD or MPEG2-TS supplied from the I/F 21 is decoded into the original video data and audio data. This video data includes the data about the menu screen as shown in FIG. 1.

Then, the video data is supplied to the D/A converter 29 to be converted into an analog video signal to be outputted. The audio data is supplied to the D/A converter 30 to be converted into an analog audio data to be outputted.

For example, as shown in FIG. 1, it is assumed that a menu screen having three selection items is displayed on the simple display device 500 and the cursor is positioned at the head of the third item. Thus, the signal reproduced by the DVD player 400 is encoded into data of the signal format such as DVCR SD or MPEG2-TS as a screen in the state in which the menu is displayed in a superimposed manner. The encoded data is transmitted through the 1394 digital interface. Therefore, the simple display device 500 can easily receive this signal.

However, simple display device 500 knows nothing about the contents of the currently displayed menu screen. Hence, if a remote commander 300 (operating means) is operated and a command such as "CURSOR UP" or "EXEC" is received by the remote commander signal receiver 31, a CPU 28 (second generating means, generating means) of the simple display device 500 cannot recognize which of the menu has been selected. Therefore, the CPU 28 of the simple display device 500 sends a command indicative of selection of "CURSOR UP" and "EXEC" by the remote commander 300 to the DVD player 400 through the I/F 21 and the 1394 digital interface. Such a command is referred to herein as a panel command.

Meanwhile, in the AV/C (Audio Video/Control) command system specifies a command type. Depending on a command type, a same OPCODE (operation code) is used in a different manner. For example, a time code command searches for a specified time code if its command type is control; if the command type is status, this command inquires the time code at a current position. Hence, this panel command is also defined as having a command type. Consequently, a command currently defined as control command can be assigned, as a panel command, with a same OPCODE.

In this case, a status specifying command such as a PB PAUSE command (for putting the system into the reproduction paused state) does not exists among the panel commands, so that all panel commands cannot be defined as panel commands without change. On the other hand, commands such as "CURSOR UP" and "EXEC" cannot be defined other than as panel commands.

If a predetermined key on the remote commander 300 is kept pressed to transmit a command repeatedly or if an operator key, not shown, arranged on the main frame of the simple display device 500 is kept pressed, the processing to be performed depends on how the command is transmitted in the simple display device 500. For example, the processing to be performed denotes processing that transmits a panel command corresponding to the "CURSOR UP" command to the DVD player 400 every 0.5 second while the key for indicating the moving of the cursor upward is kept pressed.

If the processing is variable at the receiving side (the DVD player 400) of this panel command, namely the DVD player 400 reacts every 0.5 seconds at one time and only after a period of one second or more for example at the other time, there occurs a sense of incongruity in operating the system. To prevent this problem from occurring, a processing method at repeated transmission must be agreed on beforehand between the sending side (in this case, the simple display device 500) and the receiving side (in this case, the DVD player 400).

This agreement can be made by sending an inquiry command from the sending side or the receiving side to the other to check the processing method thereof, the repeated transmission being performed accordingly. Alternatively, both sides may describe the specifications of their own processing methods and so on in predetermined descriptors.

Figure 3:
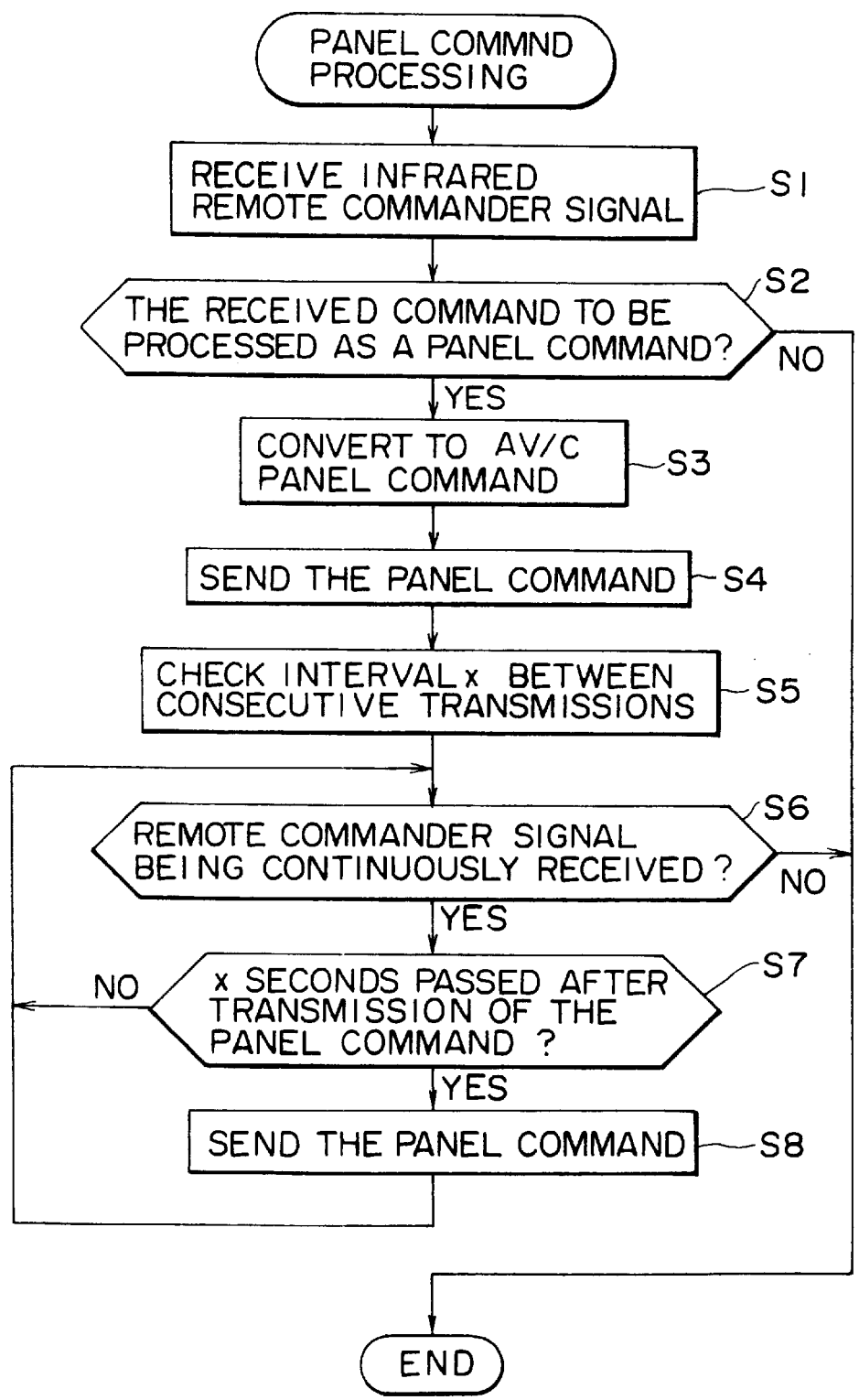
FIG. 3 is a flowchart indicative of a procedure of panel command processing.

The following describes, with reference to the flowchart of FIG. 3, a processing procedure to be executed when the remote commander 300 is operated with the menu screen as shown in FIG. 1 displayed. In what follows, an example in which the remote commander 300 is operated is described. The processing to be executed when an operator key, not shown, arranged on the main frame of the simple display device 500 is operated is basically the same as this example.

First, in step S1, a remote commander signal generated by the remote commander 300 is received by the remote commander signal receiver 31 of the simple display device 500. It is assumed that this remote commander signal is for moving the cursor up "CURSOR UP." This remote commander signal is converted into a digital signal to be supplied to the CPU 28.

In step S2, the CPU 28 determines whether the remote commander signal received by the remote commander signal receiver 31 is to be processed as a panel command or not. Namely, the CPU 28 determines whether this command is associated with OSD like a command for indicating cursor movement.

If the remote commander signal received by the remote commander signal receiver 31 is found in step S2 to be processed as a panel command, then in step S3, the remote commander signal received by the remote commander signal receiver 31 is converted into an AV/C panel command. In this case, since the remote commander signal indicating "CURSOR UP" has been received, it is determined that this signal is to be processed as a panel command. Therefore, this signal is converted into the AV/C panel command.

In step S4, under the control of the CPU 28, the converted panel command is transmitted to the DVD player 400 through the I/F 21 and the 1394 digital interface. The panel command transmitted to the DVD player 400 is supplied to the CPU 6 through the I/F 10. The CPU 6 controls the OSD generator 41 according to the panel command ("CURSOR UP") supplied from the simple display device 500 through the 1394 digital interface and the I/F 10 to move the cursor displayed in the menu screen upward by one level to the head of the second item.

In step S5, the simple display device 500 checks the interval x (in seconds) of the repeated transmission. Namely, the DVD player 400, which is the target device, checks which command coming at an interval of what seconds is regarded as a repeatedly transmitted command coming through the 1394 digital interface. This check can be made by transmitting an inquiry command from the simple display device 500 to the DVD player 4 and receiving a reply to this inquiry from the DVD player 4 as described above by way of example.

In step S6, the CPU 6 determines whether a remote commander signal is repeatedly received by the remote commander signal receiver 31 from the remote commander 300. If the remote control signal from the remote commander 300 is found received repeatedly by the remote commander signal receiver 31, then in step S7, the CPU 6 determines whether x seconds have passed since the last transmission of a panel command. If x seconds are found passed, then in step S8, the panel command is transmitted. When the panel command transmission processing in step S8 has completed or x seconds have not yet passed since the last transmission of the panel command in step S7, then back in step S6, the processing operations of step S6 and subsequent steps are repeated.

Therefore, for example, if the remote commander 300 is operated and the key for "CURSOR UP" is pressed continuously, the processing operations of steps S6 through S8 are executed repeatedly, thereby transmitting the panel command "CURSOR UP" at an interval of x seconds from the simple display device 500 to the DVD player 400 through the 1394 digital interface.

This panel command transmitted to the DVD player 400 is supplied to the CPU 6 through the I/F 10. Based on this panel command, the CPU 6 determines at which item in the menu the cursor is to be positioned. Then, the CPU 6 instructs the OSD generator 41 to display the cursor to the head of the predetermined item. According to the instruction by the CPU 6, the OSD generator 41 generates display data for displaying the cursor at the head of the predetermined item and supplies the generated display data to the SD video encoder 45. The SD video encoder 45 encodes the display data received from the OSD generator 41 into the signal format of DVCR SD or MPEG2-TS along with the video data from the video decoder 42 and the sub-picture data from the sub-picture decoder 43 and transmits the resultant data to the simple display device 500 through the I/F 10 and the 1394 digital interface.

The data transmitted to the simple display device 500 is supplied to the DVC SD decoder 51 through the I/F 21 to be decoded. The decoded data is converted to the original video data. Further, this video data is converted by the D/A converter 29 into an analog video signal to be outputted. Then, the outputted data is supplied to a display device such as an incorporated CRT, displaying a corresponding screen.

Thus, the cursor displayed on the menu moves to a next item at an interval of x seconds. When key for moving the cursor down ("CURSOR DOWN") is pressed, the cursor displayed on the menu moves the head of an item one level down from the item currently indicated by the cursor. It may be arranged that, if the key for indicating "CURSOR UP" is kept pressed with the cursor displayed at the start of the first item 1 for example, the cursor moves to the head of the last item 3. It may be also arranged that, if the cursor for indicating "CURSOR DOWN" is kept pressed, the cursor is moved to the head of the item 1. Thus, the cursor displayed on the menu can be moved to any desired menu item.

If the remote commander signal received by the remote commander signal receiver 31 is found in step S2 not to be processed as a panel command or if the remote commander signal from the remote commander 300 is found received by the remote commander signal receiver 31 not repeatedly in step S6, the processing is ended.

If the remote commander 300 is operated again with the cursor displayed at the head of the item 2 for example and a remote commander signal indicating "EXEC" is transmitted, this remote commander signal is received by the remote commander signal receiver 31. Then, as described above with reference to the flowchart of FIG. 3, this remote commander signal is converted into a panel command indicating "EXEC," which is transmitted to the DVD player 400 through the 1394 digital interface.

The panel command indicating "EXEC" transmitted to the DVD player 400 is supplied to the CPU 6 through the I/F 10. Receiving this command, the CPU 6 recognizes the item at which the cursor is positioned on the menu screen and executes the processing for that item.

As described, if the display device side has no DVD decoder, any desired item can be selected from the menu displayed on the screen to execute the processing for the selected item. In addition, if a key of the remote commander 300 is kept pressed, the processing according to a common arrangement between the remote commander signal sending and receiving sides can be executed, thereby preventing a sense of incongruity from occurring in operating the system.

It should be noted that the system terminology used herein denotes an overall apparatus composed of plural devices and means.

The transmission media as referenced herein include network transmission media such as the Internet and a digital satellite network, in addition to the information recording media such as an FD (Floppy Disc) and a CD-ROM (Compact Disc Read Only Memory).

In the above-mentioned embodiment, the remote commander 300 is operated to issue commands such as "CURSOR UP" and "EXEC." It will be apparent that these commands may be issued by operating keys arranged on the simple display device 500.

In the above-mentioned embodiment, the simple display device 500 is connected with the DVD player 400 through the 1394 digital interface. It will be apparent that this connection may be made through another bus.

In the above-mentioned embodiment, the DVD is used. It will be apparent that the present invention is also applicable to the case in which other interactive media then the DVD are used.

As mentioned above and according to the electronic equipment control system associated with the present invention and the electronic equipment control method associated with the present invention, first data recorded on the recording medium is reproduced; the first data is then decoded; based on the first data, second data is generated that corresponds to a display screen by which an interactive operation is performed; the first data and the second data are transmitted through the bus; a command is received from the second apparatus; and the reproducing apparatus is controlled according to the command received by the first receiving apparatus. The first data and the second data are received from the first transmitting apparatus; an interactive operation is performed on the screen corresponding to the second data received by the second receiving apparatus; a command is generated that corresponds to an operation performed by an operasting apparatus; the command is then transmitted. Consequently, an apparatus having no decoding apparatus can control equipment having an interactive user interface.

As mentioned above and according to the reproducing apparatus associated with the present invention, a reproducing apparatus reproduces first data recorded on the recording medium; a decoding apparatus decodes the first data reproduced by the reproducing apparatus; a generating apparatus generates, based on the first data decoded by the decoding apparatus, second data corresponding to a display screen by which an interactive operation is performed; a transmitting apparatus transmits the first data decoded by the decoding appartus and the second data generated by the generating apparatus through the bus; a receiving apparatus receives a command from the output apparatus; and a controller controls the reproducing apparatus according to the command received from the receiving apparatus. Consequently, an apparatus having no decoding apparatus can control equipment having an interactive user interface.

As described above and according to the output apparatus associated with the present invention, a receiving apparatus receives first data recorded on the recording medium reproduced by the reproducing apparatus and second data generated based on the first data, the second data corresponding to a display screen by which an interactive operation is performed; an operating apparatus operates the screen corresponding to the data received by the receiving apparatus; a generating apparatus generates a command according to the operation performed by the operating apparatus; and a transmitting apparatus transmits the command. Consequently, an apparatus having no decoding apparatus can control equipment having an interactive user interface.

As described and according to the transmission medium associated with the present invention, the computer program is transmitted, the program comprising: a reproducing step of reproducing first data recorded on the recording medium; a decoding step of decoding the first data reproduced in the reproducing step; a generating step of generating, based on the first data decoded in the decoding step, second data corresponding to a screen by which an interactive operation is performed; a transmitting step of transmitting through the bus the first data decoded in the decoding step and the second data generated in the generating step; a receiving step of receiving a command from the second apparatus; and a control step of controlling operation in the reproducing step according to the command received in the receiving step.

As described and according to the transmission medium associated with present invention, the computer program is transmitted, the computer program comprising: a receiving step of receiving first data recorded on the recording medium reproduced by the reproducing apparatus and second data generated based on the first data, the second data corresponding to a screen by which an interactive operation is performed; an operating step of performing an interactive operation on the screen corresponding to the data received in the receiving step; a generating step of generating a command according to the operation performed in the operating step; and a transmitting step of transmitting the command. Consequently, an apparatus having no decoding apparatus can control equipment having an interactive user interface.

While the preferred embodiments of the present invention have been described using specific terms, such description is for illustrative purposes only, and it is to be understood that changes and variations may be made without departing from the spirit or scope of the appended claims.

What is claimed is:

1. An electronic equipment control system having an interactive user interface, with a first apparatus of the system for reproducing a predetermined recording medium connected through a bus to a second apparatus of the system for outputting data reproduced by said first apparatus, said second apparatus controlling an operation of said first apparatus, said first apparatus comprising:
- a reproducing means for reproducing first data recorded on said recording medium;
- a decoding means for decoding said first data reproduced by said reproducing means;
- a first generating means for generating, based on said first data decoded by said decoding means, second data corresponding to a screen by which an interactive operation is performed;
- first transmitting means for transmitting through said bus said first data decoded by said decoding means and said second data generated by said first generating means;
- a first receiving means for receiving a command from said second apparatus; and
- a control means for controlling said reproducing means according to said command received by said first receiving means;

said second apparatus comprising:
- a second receiving means for receiving said first data and said second data from said first transmitting means;
- an operating means for performing an interactive operation on said screen corresponding to said second data received by said second receiving means;
- a second generating means for generating a command corresponding to an operation performed by said operating means; and
- a second transmitting means for transmitting said command.

2. The electronic equipment control system as claimed in claim 1, wherein said command is made of the data generated by said first generating means, said data being indicative of an interactive operation performed on a screen.

3. An electronic equipment control method in an electronic equipment control system having an interactive user interface, with a first apparatus of the system for reproducing a predetermined recording medium connected through a bus to a second apparatus of the system for outputting data reproduced by said first apparatus, said second apparatus controlling an operation of said first apparatus, comprising:
- a reproducing step of reproducing first data recorded on said recording medium;
- a decoding step of decoding said first data reproduced in said reproducing step;
- a first generating step of generating, based on said first data decoded in said decoding step, second data corresponding to a screen by which an interactive operation is performed;
- a first transmitting step of transmitting through said bus said first data decoded in said decoding step and said second data generated in said first generating step;
- a first receiving step of receiving a command from said second apparatus;
- a control step of controlling the reproduction processing in said reproducing step according to said command received in said first receiving step;
- a second receiving step of receiving said first data and said second data from said first apparatus;
- an operating step of performing an interactive operation on said screen corresponding to said second data received in said second receiving step;
- a second generating step of generating a command corresponding to an operation performed in said operating step; and
- a second transmitting step of transmitting said command.

4. A reproducing apparatus for use in an electronic equipment control system having an interactive user interface, with the reproducing apparatus for reproducing a predetermined recording medium connected through a bus to an output apparatus for outputting data reproduced by said reproducing apparatus, said output apparatus controlling an operation of said reproducing apparatus, comprising:
- a reproducing means for reproducing first data recorded on said recording medium;
- a decoding means for decoding said first data reproduced by said reproducing means;
- a generating means for generating, based on said first data decoded by said decoding means, second data corresponding to a screen by which an interactive operation is performed;
- a transmitting means for transmitting through said bus said first data decoded by said decoding means and said second data generated by said generating means;
- a receiving means for receiving a command from said output apparatus; and
- a control means for controlling said reproducing means according to said command received from said receiving means.

5. An output apparatus for use in an electronic equipment control system having an interactive user interface, with a reproducing apparatus for reproducing a predetermined recording medium connected through a bus to the output apparatus for outputting data reproduced by said reproducing apparatus, said output apparatus controlling an operation of said reproducing apparatus, comprising:
- a receiving means for receiving first data recorded on said recording medium reproduced by said reproducing apparatus and second data generated by the reproducing apparatus based on said first data, said second data corresponding to a screen by which an interactive operation is performed;
- an operating means for operating said screen corresponding to said data received by said receiving means from the reproducing apparatus;
- a generating means for generating a command according to the operation of said operating means; and
- a transmitting means for transmitting said command.

6. A transmission medium for transmitting a computer program for controlling a reproducing apparatus for use in an electronic equipment control system having an interactive user interface, with the reproducing apparatus for reproducing a predetermined recording medium connected through a bus to an output apparatus for outputting data reproduced by said reproducing apparatus, said output apparatus controlling an operation of said reproducing apparatus, said computer program comprising:
- a reproducing step of reproducing first data recorded on said recording medium;
- a decoding step of decoding said first data reproduced in said reproducing step;
- a generating step of generating, based on said first data decoded in said decoding step, second data corresponding to a screen by which an interactive operation is performed;
- a transmitting step of transmitting through said bus said first data decoded in said decoding step and said second data generated in said generating step;

a receiving step of receiving a command from said second apparatus; and a control step of controlling the operation in said reproducing step according to said command received in said receiving step.

7. A transmission medium for transmitting a computer program for controlling a reproducing apparatus for use in an electronic equipment control system having an interactive user interface, with the reproducing apparatus for reproducing a predetermined recording medium connected through a bus to an output apparatus for outputting data reproduced by said reproducing apparatus, said output apparatus controlling an operation of said reproducing apparatus, said computer program comprising:

a receiving step of receiving first data recorded on said recording medium reproduced by said reproducing apparatus and second data generated by the reproducing apparatus based on said first data, said second data corresponding to a screen by which an interactive operation is performed;

an operating step of performing an interactive operation on said screen corresponding to said data received from the reproducing apparatus in said receiving step;

a generating step of generating a command according to the operation performed in said operating step; and a transmitting step of transmitting said command.

8. The electronic equipment control system as claimed in claim 1, wherein said bus is based on the IEEE 1394 standard.

9. The electronic equipment control method as claimed in claim 3, where in said bus is based on the IEEE standard.

10. The reproducing apparatus as claimed in claim 4, wherein said bus is based on the IEEE 1394 standard.

11. The output apparatus as claimed in claim 5, in said bus is based on the IEEE 1394 standard.

* * * * *